(12) United States Patent
Chen

(10) Patent No.: US 9,915,833 B2
(45) Date of Patent: Mar. 13, 2018

(54) FARADAY ROTATOR MIRROR

(71) Applicant: OPSMITH TECHNOLOGIES CO., LTD., Shanghai (CN)

(72) Inventor: Sisi Chen, Shanghai (CN)

(73) Assignee: Opsmith Technologies Co., Ltd., Shanghai (CN)

( * ) Notice: Subject to any disclaimer, the term of this patent is extended or adjusted under 35 U.S.C. 154(b) by 0 days.

(21) Appl. No.: 15/173,744

(22) Filed: Jun. 6, 2016

(65) Prior Publication Data

US 2016/0282641 A1 Sep. 29, 2016

Related U.S. Application Data

(63) Continuation-in-part of application No. PCT/CN2014/092355, filed on Nov. 27, 2014.

(30) Foreign Application Priority Data

| Dec. 4, 2013 | (CN) | 2013 1 0646181 |
| Oct. 13, 2014 | (CN) | 2014 1 0539249 |
| Nov. 18, 2014 | (CN) | 2014 1 0657273 |

(51) Int. Cl.

| *G02F 1/095* | (2006.01) |
| *G02B 5/04* | (2006.01) |
| *G02B 5/08* | (2006.01) |
| *G02B 27/10* | (2006.01) |
| *G02B 5/30* | (2006.01) |
| *G02F 1/09* | (2006.01) |
| *G02B 27/28* | (2006.01) |

(52) U.S. Cl.
CPC ............ *G02F 1/0955* (2013.01); *G02B 5/04* (2013.01); *G02B 5/08* (2013.01); *G02B 5/3083* (2013.01); *G02B 27/1006* (2013.01); *G02B 27/28* (2013.01); *G02F 1/09* (2013.01)

(58) Field of Classification Search
CPC .......... G02B 5/04; G02B 5/08; G02B 5/3083; G02B 27/1006; G02B 27/28; G02F 1/09; G02F 1/093; G02F 1/0955
USPC ............ 359/484.04, 484.09, 831; 385/11, 12
See application file for complete search history.

(56) References Cited

U.S. PATENT DOCUMENTS

| 5,278,853 A * | 1/1994 | Shirai | G02B 6/2746 372/37 |
| 5,574,595 A * | 11/1996 | Kurata | G02F 1/093 359/484.04 |
| 5,930,418 A * | 7/1999 | Chang | G02B 6/2746 385/11 |
| 6,040,942 A * | 3/2000 | Bergmann | G02B 5/3083 359/485.02 |

(Continued)

*Primary Examiner* — Frank Font
(74) *Attorney, Agent, or Firm* — Wood Herron & Evans LLP

(57) ABSTRACT

A Faraday rotator mirror, including: a polarizing beam splitter, a polarizing beam converging device made from birefringent crystal, a Faraday rotator, a reflecting mirror. In operation, light rays from an optical coupling element pass through the polarizing beam splitter, the polarizing beam converging device, the Faraday rotator, and the reflecting mirror, in that order, and then return back through the Faraday rotator, the polarizing beam converging device, and the polarizing beam splitter, in that order, and are output from the optical coupling element in reverse to the original incidence path.

11 Claims, 12 Drawing Sheets

(56) References Cited

U.S. PATENT DOCUMENTS

| | | | | | |
|---|---|---|---|---|---|
| 6,055,104 | A | * | 4/2000 | Cheng | G02B 6/266 359/484.08 |
| 6,690,854 | B2 | * | 2/2004 | Helbing | G02B 6/12007 359/484.09 |
| 7,072,111 | B2 | * | 7/2006 | Iwatsuka | G02B 6/2746 359/282 |
| 2002/0171932 | A1 | * | 11/2002 | Xiao | G02F 1/313 359/484.06 |
| 2003/0058536 | A1 | * | 3/2003 | Huang | G02B 6/2746 359/484.04 |
| 2004/0081392 | A1 | * | 4/2004 | Li | G02F 1/09 385/22 |

\* cited by examiner

FARADAY ROTATOR MIRROR

CROSS-REFERENCE TO RELATED APPLICATIONS

This application is a continuation-in-part of International Patent Application No. PCT/CN2014/092355 with an international filing date of Nov. 27, 2014, designating the United States, now pending, and further claims priority benefits to Chinese Patent Application No. 201310646181.0 filed Dec. 4, 2013, Chinese Patent Application No. 201410539249.X filed Oct. 13, 2014, and Chinese Patent Application No. 201410657273.3 filed Nov. 18, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to the field of optical fiber sensing and optical fiber communication, and more particularly to a Faraday rotator mirror which is wavelength-independent and temperature-independent.

Description of the Related Art

The Faraday rotator mirror operates to eliminate polarization-induced signal fading in fiber-optic interferometers. Conventional Faraday rotator mirror is adversely influenced by factors such as wavelength and temperature, leading to a low signal-to-noise ratio. In general, birefringent elements and beam converging devices are introduced to solve the adverse effects caused by wavelength and temperature. This reduces the extinction ratio of the polarization apparatus, and increases the size and production costs thereof.

SUMMARY OF THE INVENTION

In view of the above-described problems, it is one objective of the invention to provide a Faraday rotator mirror which is wavelength-independent and temperature-independent. The Faraday rotator mirror is capable of eliminating the polarized light components along the dispersion direction of the rotation angle after the rotation angle produced by the Faraday rotator deviates 90 degrees, so that lights having different wavelengths have the same linear polarization, thus eliminating the effects of wavelength and temperature on the rotation angle. Meanwhile, the extinction ratio of the Faraday rotator mirror is improved, and the insertion loss is reduced. The Faraday rotator mirror features proper size and low costs.

To achieve the above objective, in accordance with one embodiment of the invention, there is provided a Faraday rotator mirror which is wavelength-independent and temperature-independent. Under the action of a beam converging device, two light beams radiating from a polarizing beam splitter have light paths thereof exchanged at a reflecting mirror and transmit reversely. Polarized lights experiencing twice rotation in a Faraday rotator are merged into an incident light path by a polarizing beam splitter, and meanwhile, polarized light components having 90 degrees' deviation along the dispersion direction of the rotation angle deviate from the incident light path, thereby eliminating effects of wavelength and temperature on the Faraday rotator mirror.

In a class of this embodiment, the function of beam convergence of the beam converging device is achieved by using any one of three kinds of optical elements: a refractive prism element which is isotropic and polarization-independent, such as Fresnel biprism made from glass; a refractive prism element which is anisotropic and polarization-dependent, such as Nomarski prism or Wollaston prism made from birefringent crystal; and beam reflective element made from reflective coating of optical interference or optical medium interface capable of total reflection.

In a class of this embodiment, the Faraday rotator is an optical device adapted to rotate polarization directions of lights using a magneto-optical effect. The Faraday rotator comprises a non-reciprocal magneto-optic crystal and a permanent magnet adapted to provide a saturation magnetic field for crystals. The Faraday rotator comprises two Faraday magneto-optic crystals having arbitrary thicknesses, and a total rotation angle of one light beam after the light beam passes through the two Faraday magneto-optic crystals is 90 degrees.

In a class of this embodiment, the polarizing beam splitter (PBS) is a coating element of optical interference, a birefringent crystal element, or a composite element of birefringent crystal, such as MacNeille Optical Coating PBS, Wollaston Prism PBS, Double Wollaston Prism PBS, Polarization Beam Displacer (PBD), Rochon Prism, Nicol Prism, Birefringent Crystal Wedge, Senarmont Prism, or Nomarski Prism.

Preferably, lights are input from an optical coupling element, pass through the polarizing beam splitter, the refractive beam converging device which is polarization-independent, the Faraday rotator, the reflecting mirror, in that order, return back through the Faraday rotator, the refractive beam converging device, the polarizing beam splitter, in that order, and get back to the optical coupling element; or the lights are input from the optical coupling element, pass through the polarizing beam splitter, the Faraday rotator, the refractive beam converging device, the reflecting mirror, in that order, return back through the refractive beam converging device, the Faraday rotator, the polarizing beam splitter, and get back to the optical coupling element. Two light beams separated by the polarizing beam splitter have light paths exchanged and transmit reversely after passing through the refractive beam converging device. Rotation angles of the two light beams after twice rotation of the Faraday rotator are nearly 90 degrees, and the two lights are merged into an incident light path after passing the polarizing beam splitter again, meanwhile, polarized light components of the two light beams along a dispersion direction of the rotation angles after 90 degrees deviation deviate from the incident light path, thereby eliminating effects of polarized light components having 90 degrees' deviation along the dispersion direction of the rotation angle on states of polarization of lights on the incident light path. Thus lights having different wavelengths can output with the same state of polarization.

In a class of this embodiment, the polarizing beam splitter (PBS) is a coating element of optical interference, a birefringent crystal element, or a composite element of birefringent crystal. The refractive beam converging device which is polarization-independent is a refractive element or a composite refractive element made from isotropic optical media, such as Fresnel biprism.

In a class of this embodiment, the refractive beam converging device is polarization-independent. When two polarized light beams enter into the refractive beam converging device and are parallel, a part of the polarized light beams having overlapped light energy could not have light paths exchanged, and then returns back along the original light paths. For example, when the polarizing beam splitter is the Polarization Beam Displacer (PBD) and two polarized light beams that enter into the Fresnel biprism are parallel, the extinction ratio of refractive lights of the Fresnel biprism is relative to the space displacement of the two polarized light beams. To achieve a high extinction ratio, the space displacement is required to be more than two times of a mode field diameter based on Gaussian distribution. When the two polarized light beams are unparallel, a part of the polarized light beams having overlapped light energy could neither have light paths exchanged, nor returns back along the original light paths. No adverse impact is on the extinction ratio, however, light energy loses more. For example, when the polarizing beam splitter is the Wollaston Prism PBS, the extinction ratio of refractive lights is no longer dependent to dependent on the space displacement of the two polarized light beams.

Preferably, the lights are input from the optical coupling element, pass through the polarizing beam splitter, the refractive beam converging device, the Faraday rotator, the reflecting mirror, in that order, back through the Faraday rotator, the refractive beam converging device, the polarizing beam splitter, in that order, and are output reversely by the optical coupling element.

Preferably, the lights are input from the optical coupling element, pass through the polarizing beam splitter, the Faraday rotator, the refractive beam converging device, the reflecting mirror, in that order, return back through the refractive beam converging device, the Faraday rotator, the polarizing beam splitter, in that order, and are output reversely by the optical coupling element.

Preferably, the lights are input from the optical coupling element, pass through a first composite element of the polarizing beam splitter and a reflective beam converging device, the Faraday rotator, the reflecting mirror, in that order, return back through the Faraday rotator, the first composite element, and get back to the optical coupling element; two light beams separated by the first composite element meet, have light paths exchanged, and transmit reversely. Rotation angles of the two light beams after twice rotation of the Faraday rotator are nearly 90 degrees, and the two lights are merged into an incident light path after passing the first composite element for the second time, meanwhile, polarized light components of the two light beams along a dispersion direction of the rotation angles after 90 degrees deviation deviate from the incident light path, thereby eliminating effects of polarized light components having 90 degrees' deviation along the dispersion direction of the rotation angle on states of polarization of lights on the incident light path. Thus lights having different wavelengths can output with the same state of polarization.

In a class of this embodiment, the first composite element integrates functions of the polarizing beam splitter and the reflective beam converging device. The polarizing beam splitter is a coating element of optical interference, a birefringent crystal element, or a composite element of birefringent crystal. The reflective beam converging device is a beam reflective element made from reflective coating of optical interference or optical medium interface capable of total reflection. The first composite element is a lateral displacement polarizing splitter or a polarization beam displacer (PBD) having a high-reflectivity interface on a side surface.

In a class of this embodiment, light reflection and refraction of the first composite element are merely dependent on an incident direction of a light, and the extinction ratio is not affected by overlapped light energy of two polarized light beams that are separated by the polarizing beam splitter.

Preferably, the lights are input from the optical coupling element, pass through the first composite element of the polarizing beam splitter and the reflective beam converging device, the Faraday rotator, the reflecting mirror, in that order, return back through the Faraday rotator, the first composite element, and transmit reversely by the optical coupling element.

Preferably, the lights are input from the optical coupling element, pass through the polarizing beam splitter, a polarizing beam converging device made from birefringent crystal, the Faraday rotator, the reflecting mirror, in that order, return back through the Faraday rotator, the polarizing beam converging device, and the polarizing beam splitter, in that order, and get back to the optical coupling element. Two light beams separated by the polarizing beam splitter have light paths exchanged and transmit reversely after passing through the polarizing beam converging device. Rotation angles of the two light beams after twice rotation of the Faraday rotator are nearly 90 degrees, and the two lights are merged into an incident light path after passing the polarizing beam splitter again, meanwhile, polarized light components of the two light beams along a dispersion direction of the rotation angles after 90 degrees deviation deviate from the incident light path, thereby eliminating effects of polarized light components having 90 degrees' deviation along the dispersion direction of the rotation angle on states of polarization of lights on the incident light path. Thus lights having different wavelengths can output with the same state of polarization.

In a class of this embodiment, the polarizing beam splitter is the coating element of optical interference, the birefringent crystal element, or the birefringent crystal composite element. The polarizing beam converging device is the birefringent crystal element or the composite element of birefringent crystal, such as Wollaston Prism, Double Wollaston Prism, Polarization Beam Displacer (PBD), Rochon Prism, Nicol Prism, Birefringent Crystal Wedge, Senarmont Prism, or Nomarski Prism; or, a second composite element integrating functions of the polarizing beam splitter and the polarizing beam converging device is also the birefringent crystal composite element, such as Nomarski Prism.

In a class of this embodiment, the polarizing beam converging device is the birefringent crystal element or the composite element of birefringent crystal, and the birefringent crystal element and the composite element of birefringent crystal generate different light deviations only according to different states of polarization, thus the extinction ratio and light energy loss have nothing to do with overlapped light energy of two polarized light beams.

In a class of this embodiment, the Nomarski Prism is a composite crystal composed of two wedge-shaped birefringent crystals and features compact structure. The Nomarski Prism is mostly applied to differential interference contrast microscopy. The merging effect produced by the Nomarski Prism is dependent on polarization directions of two polarized light beams and has nothing to do with energy space distributions of the two polarized light beams. Even if the energy spaces coincide, a high extinction ratio remains. The extinction ratio of the Nomarski Prism is only determined by the extinction ratio of the birefringent crystals, and the extinction ratio of the Faraday rotator mirror comprising the Nomarski Prism is not limited by energy space distributions of an ordinary light and an extraordinary light.

In a class of this embodiment, when two polarized light beams enter into an optical lens (as a beam converging device) and are parallel, lights having overlapped light energy could not have light paths exchanged, and then return back along the original light path, which lowers the extinction ratio down. Thus the extinction ratio of the Faraday rotator mirror comprising the optical lens is dependent on the space distribution of light energy. To achieve a high extinction ratio, the space displacement of the two polarized light beams is required to be more than two times of a mode field diameter based on Gaussian distribution. The extinction ratio of the Faraday rotator mirror is dependent on the space displacement, and large-size birefringent materials lead to large space displacements of polarized lights and therefore, a high extinction ratio.

Preferably, the light rays from an optical coupling element pass through the polarizing beam splitter, the polarizing beam converging device, the Faraday rotator, and the reflecting mirror, in that order, and then return back through the Faraday rotator, the polarizing beam converging device, and the polarizing beam splitter, in that order, and are output from the optical coupling element in reverse to an original incidence path.

Preferably, the light rays from an optical coupling element pass through the composite element of the polarizing beam splitter and the polarizing beam converging device, the Faraday rotator, and the reflecting mirror, in that order, and then return back through the Faraday rotator, the composite element of the polarizing beam splitter and the polarizing beam converging device, in that order, and are output from the optical coupling element in reverse to an original incidence path.

The dispersion of the Faraday non-reciprocal magneto-optic crystal and adverse effects of temperature on the rotation angle are completed eliminated.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a Faraday rotator mirror which is wavelength-independent and temperature-independent are described below. It should be noted that the following examples are intended to describe and not to limit the invention.

Figure 1:
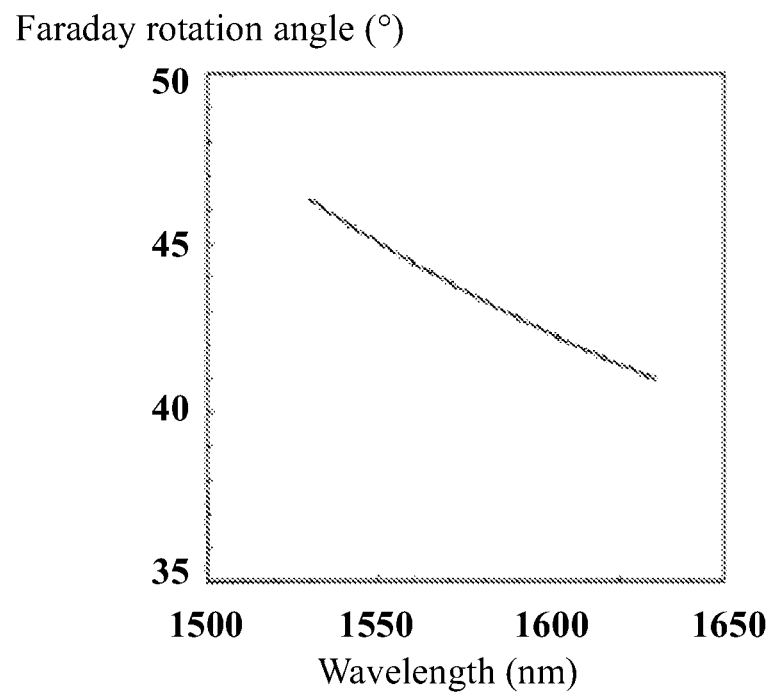
FIG. 1 is a curve diagram of relation of rotation angles and wavelengths of a Faraday crystal in accordance with one embodiment of the invention.

FIG. 1 shows that in a saturation magnetic field, rotation angles of linearly polarized lights by the non-reciprocal Faraday magneto-optic crystal are dependent on wavelengths; at certain temperature, the longer the wavelength is, the smaller the rotation angle is.

Figure 2:
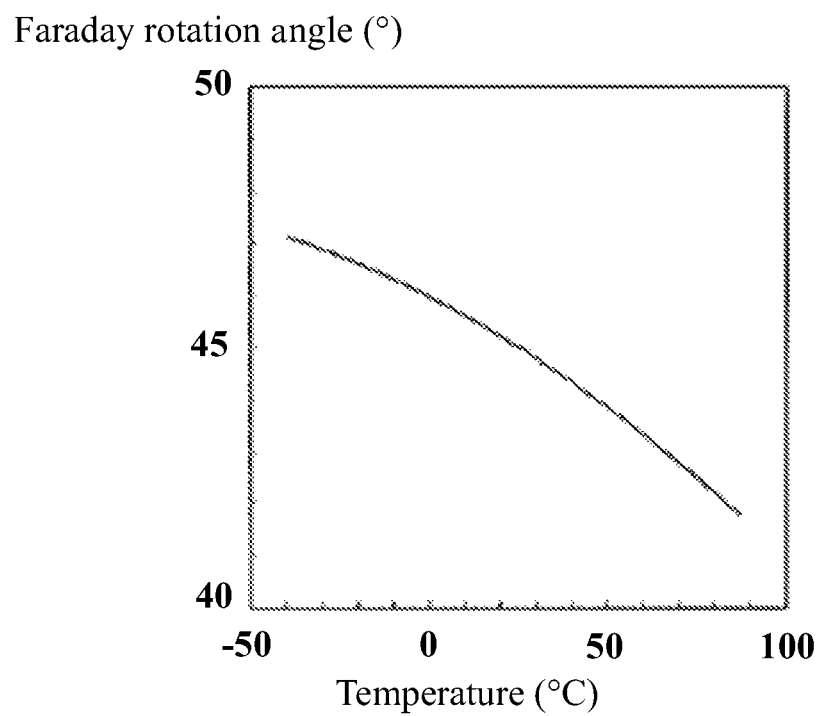
FIG. 2 is a curve diagram of relation of rotations angles and temperatures of a Faraday crystal in accordance with one embodiment of the invention.

FIG. 2 shows that in a saturation magnetic field, rotation angles of linearly polarized lights by the non-reciprocal Faraday magneto-optic crystal are relative to temperatures; for lights having a certain wavelength, the higher the temperature is, the smaller the rotation angle is.

Figure 3:
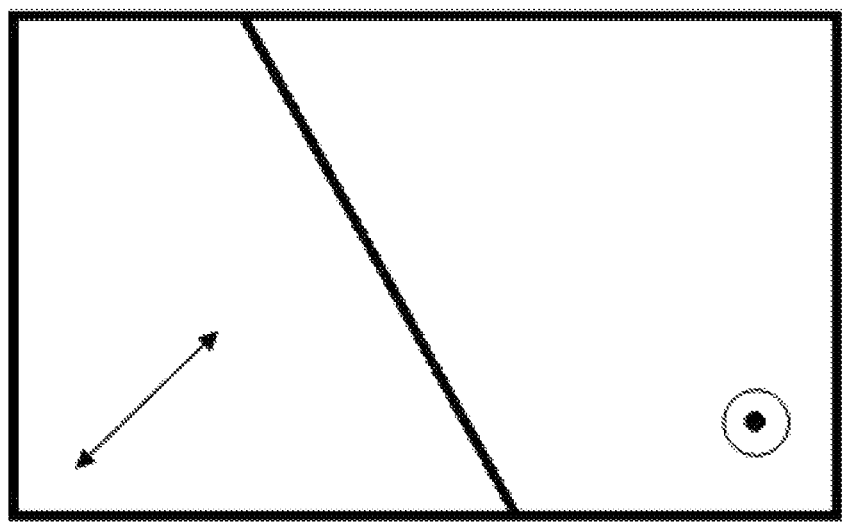
FIG. 3 is a schematic diagram of a Nomarski Prism in accordance with one embodiment of the invention.

FIG. 3 is a schematic diagram of a Nomarski prism. The Nomarski Prism is a composite birefringent crystal comprising two wedge-shaped birefringent crystals. The arrows demonstrate two optical axis directions of the two crystals: one is parallel to the paper, and another is vertical to the paper.

Figure 4A:
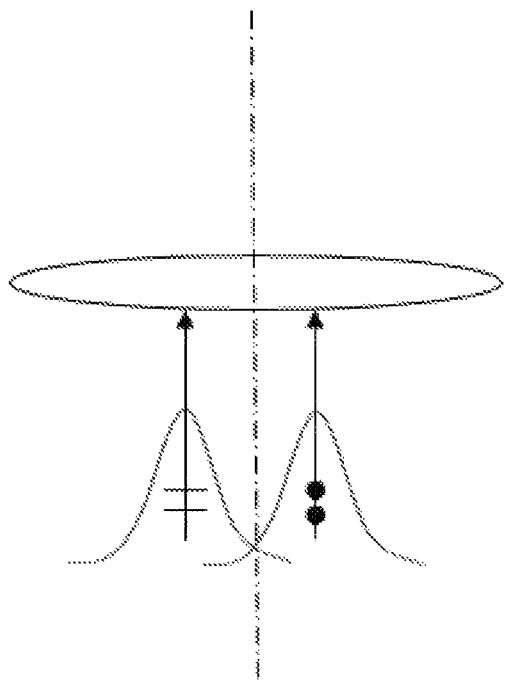
FIGS. 4A-4B are diagrams showing a Gaussian distribution of light intensities of two polarized light beams in accordance with one embodiment of the invention.
Figure 4B:
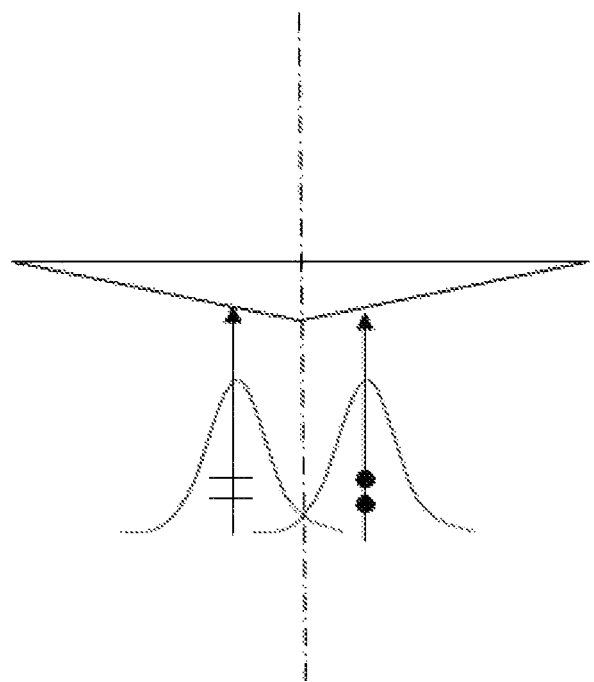

FIG. 4 is a diagram showing a Gaussian distribution of light intensities of two polarized light beams. As shown in FIG. 4, light energies of two parallel lights partially overlap in the optical paths.

Figure 5:
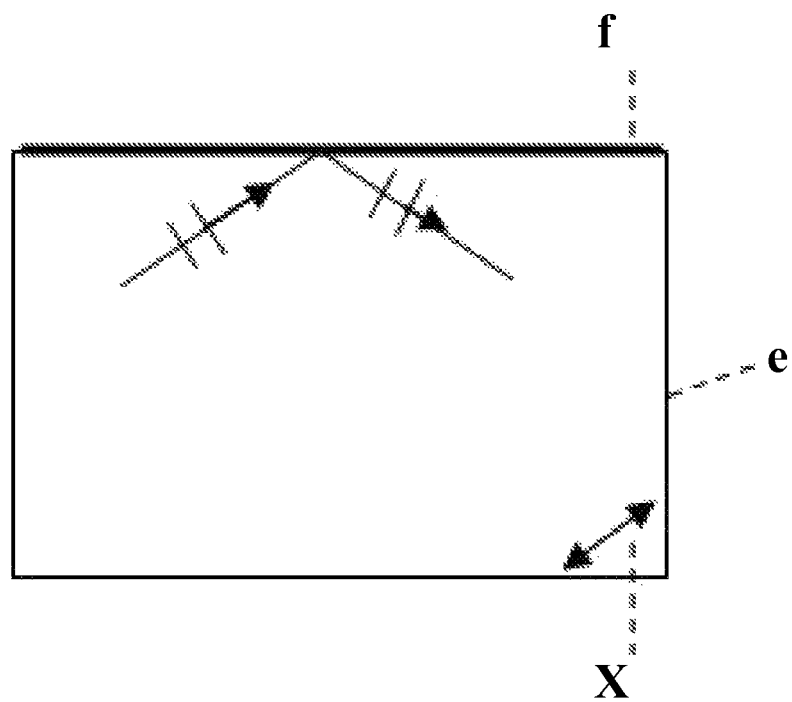
FIG. 5 is a schematic diagram of a polarization beam displacer (PBD) having a high-reflectivity interface on a side surface in accordance with one embodiment of the invention.

FIG. 5 is a schematic diagram of a Polarization Beam Displacer (PBD) having a high-reflectivity interface on a side surface. Optionally, the high-reflectivity interface is a well-polished interface capable of total reflection, a coating or a metal coating of optical interference having high reflectivity. e is a Polarization Beam Displacer; f is the high-reflectivity interface; and X is an optical axis direction.

Figure 6:
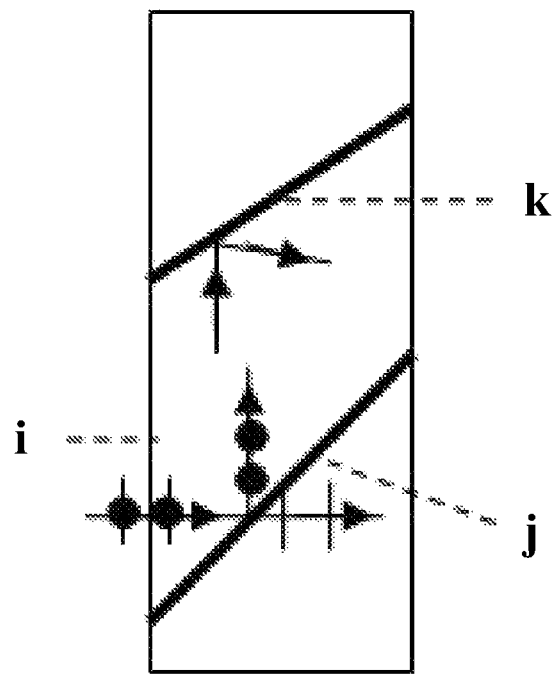
FIG. 6 is a schematic diagram of lateral displacement polarizing splitter in accordance with one embodiment of the invention.

FIG. 6 is a schematic diagram of Lateral Displacement Polarizing splitter having a high-reflectivity interface on a side surface. Optionally, the high-reflectivity interface is a well-polished total reflection interface, a coating or a metal coating of optical interference having high reflectivity. i is a hexahedral glass; j is a coating of optical interference (MacNeille coating); k is the high-reflectivity interface. j is not parallel to k and a certain angle is formed between j and k.

Example 1

Figure 7:
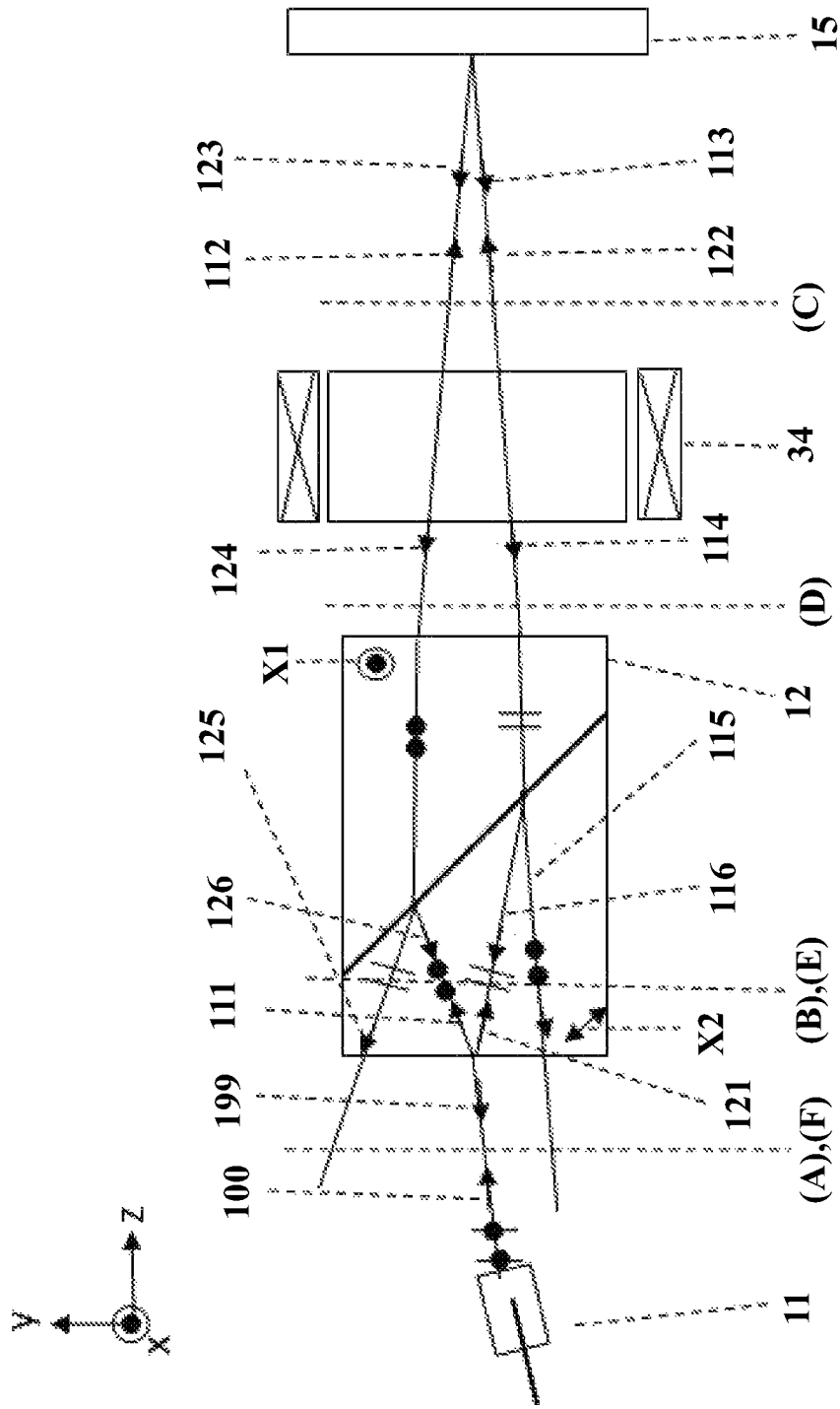
FIG. 7 is a schematic diagram of a Faraday rotator mirror and an optical path diagram in Example 1.
Figure 8A:
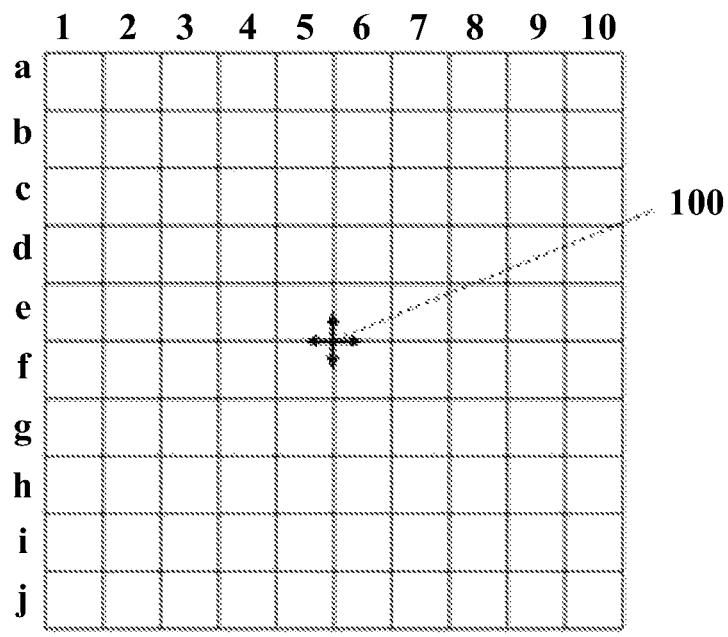
FIGS. 8A-8B are first diagrams showing states of polarization of transmitted light beams in Example 1.
Figure 8B:
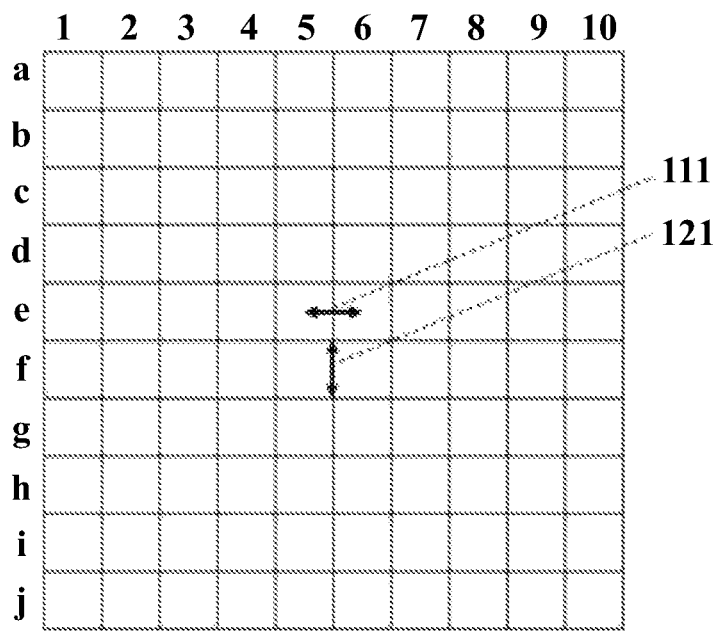
Figure 9A:
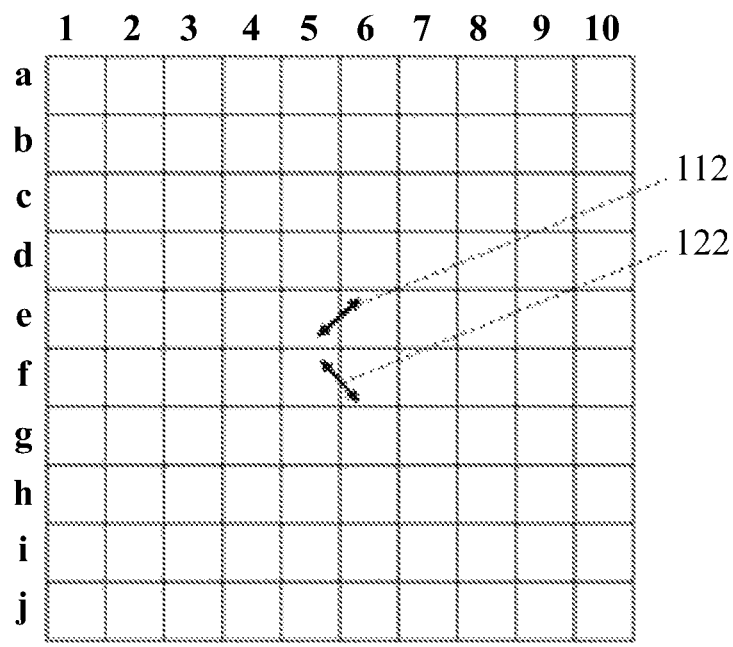
FIGS. 9A-9B are second diagrams showing states of polarization of transmitted light beams in Example 1.
Figure 9B:
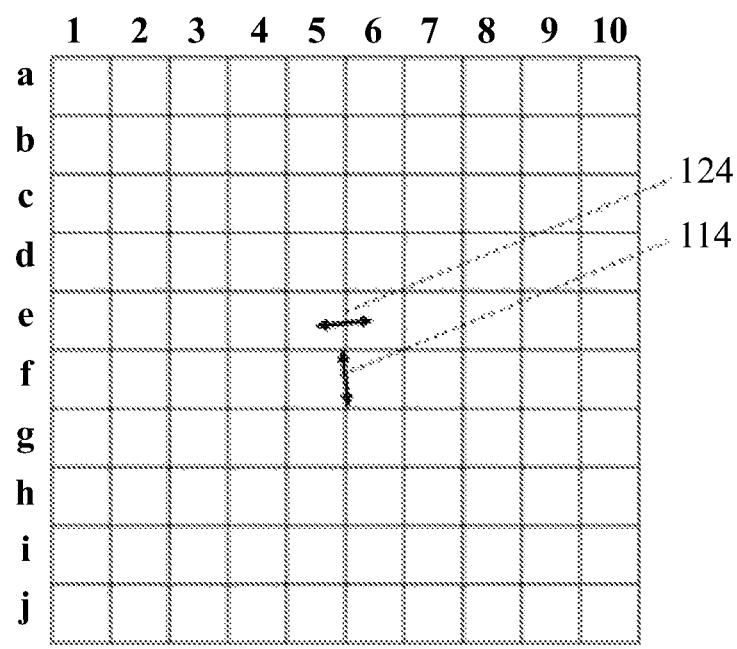
Figure 10A:
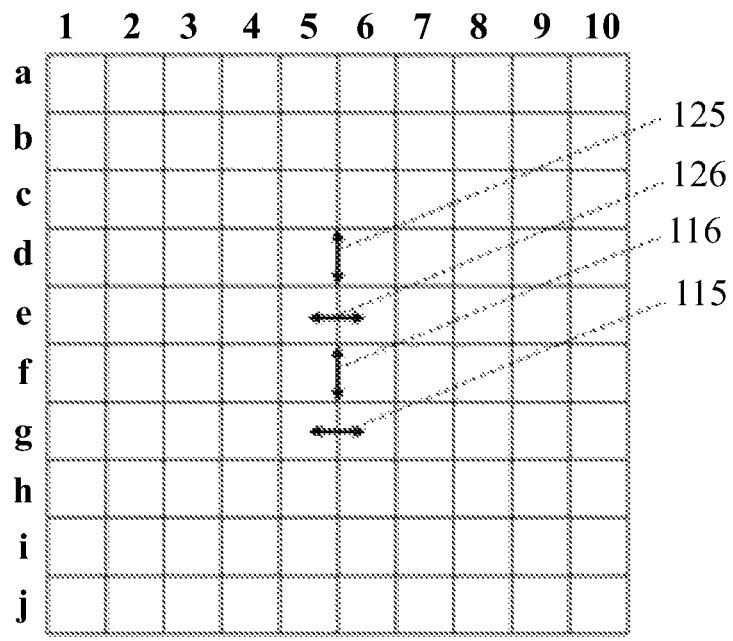
FIGS. 10A-10B are third diagrams showing states of polarization of transmitted light beams in Example 1.
Figure 10B:
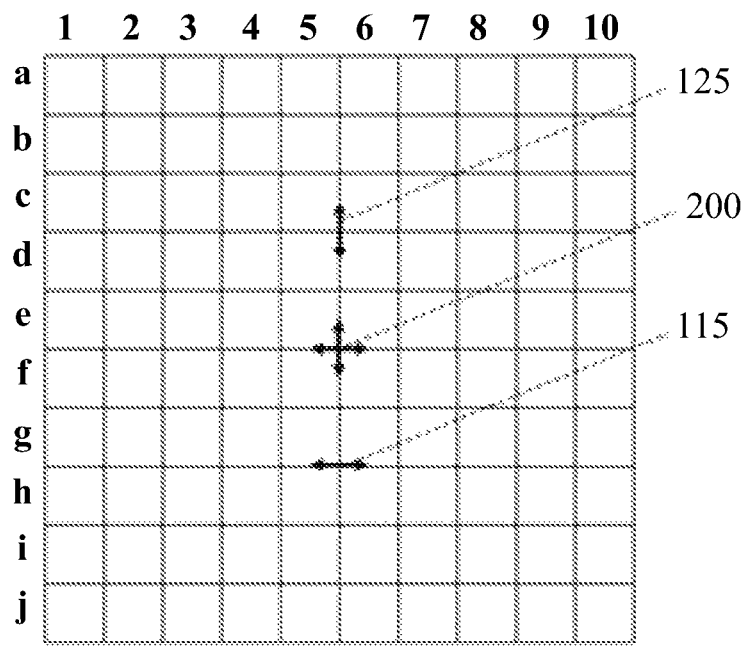

As shown in FIG. 7, a Faraday rotator mirror comprises a single-mode single-fiber collimator 11, a Nomarski Prism 12, a Faraday rotator 34, and a plane mirror 15 made from optical coating. In a rectangular coordinate system, an optical axis X1 of the Nomarski Prism is coincident with the x axis, and an optical axis X2 thereof is in the y-z plane.

A light 100 is emitted by the single-mode single-fiber collimator 11, and radiates along the z axis. When passing through the Nomarski Prism 12, the light is divided into two linearly polarized lights that are orthogonal: a first ordinary light 111 and a first extraordinary light 121. The lights are converged after passing through an interface of two wedge blocks of the Nomarski Prism, and pass through the Faraday rotator 34 where vibration planes are rotated by nearly 45 degrees to be a first light beam 112 and a second light beam 122. The first light beam 112 and the second light beam 122 meet at the plane mirror 15, have optical paths exchanged, and become a first reflective light 113 and a second reflective light 123, respectively. The reflective lights radiate along a negative direction of the z axis and pass through the Faraday rotator 34 for the second time. The vibration planes are again rotated by nearly 45 degrees (a total of 90 degrees) to be a third light beam 114 and a fourth light beam 124. After entering into the Nomarski Prism, the fourth light beam 124 is divided to be a second extraordinary light 125 and a second ordinary light 126. The second extraordinary light 125 is from the polarized light component of the fourth light beam 124 in the y-z plane. The third light beam 114 is divided to be a third ordinary light 115 and a third extraordinary light 116. The third ordinary light 115 is from the polarized light component of the third light beam 114 in the x-axis direction. The third extraordinary light 116 and the second ordinary light 126 are merged to be a main light beam 199 after passing through the Nomarski Prism 12. The third ordinary light 115 and the second extraordinary light 125 are separated from each other in a certain distance and deviate from the main light beam 199. Finally, the main light beam 199 is coupled to the single-mode single-fiber collimator 11.

The Nomarski Prism 12 is a composite element of a polarizing beam splitter and the polarizing beam converging device made from birefringent crystal and combines the functions of the two. The Faraday rotator mirror has a small size and a high extinction ratio.

Amidst the light transmission, positions (A), (B), (C), (D), (E), and (F) are marked, and states of polarization at cross sections of the positions are shown correspondingly in FIGS. 8A-10B.

The Faraday rotator mirror is capable of eliminating the polarized light components along the dispersion direction of the rotation angle after 90 degrees' deviation, thus eliminating the effects of wavelength and temperature on the rotation angle and on the Faraday rotator mirror.

Example 2

Figure 11:
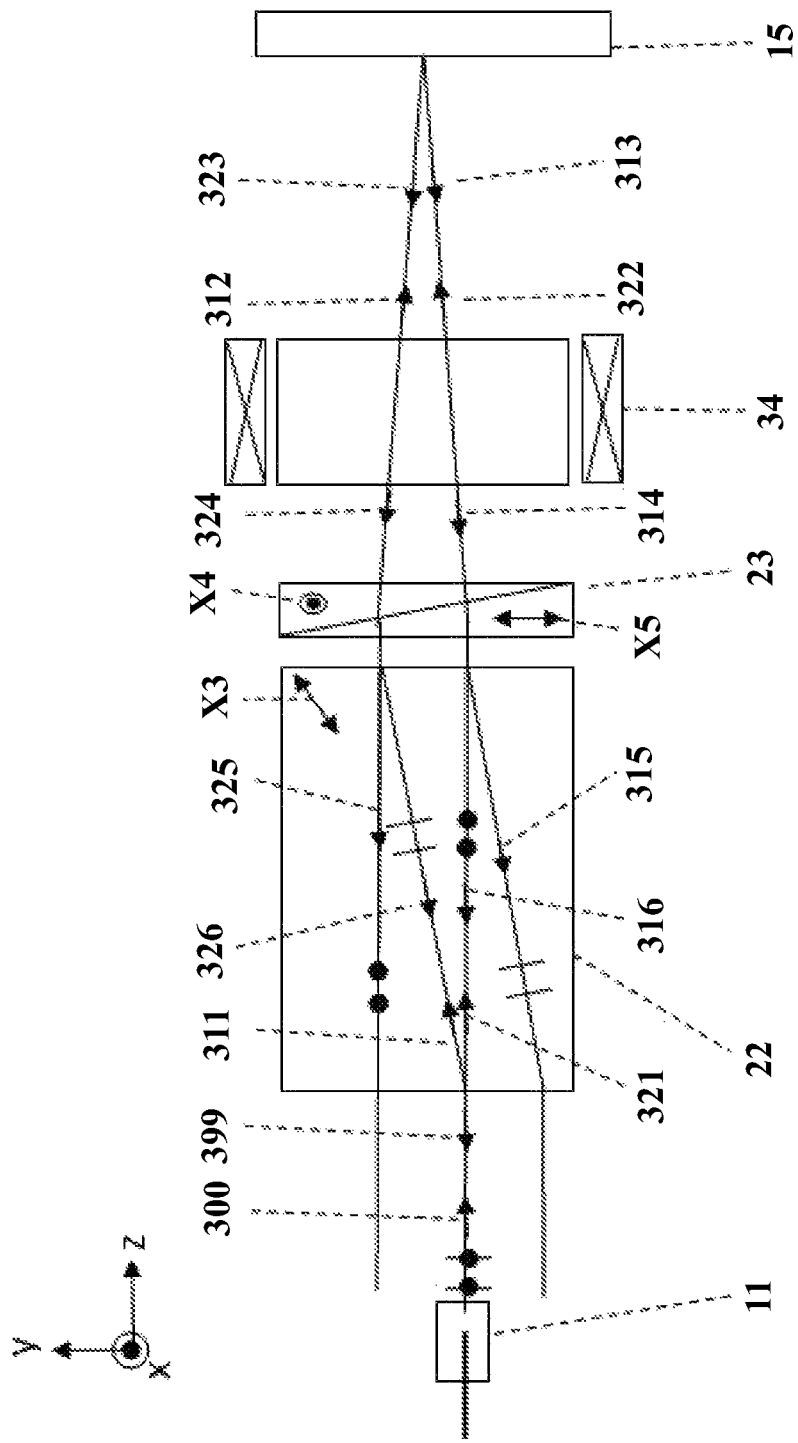
FIG. 11 is a schematic diagram of a Faraday rotator mirror and an optical path diagram in Example 2.

As shown in FIG. 11, a Faraday rotator mirror comprises a single-mode single-fiber collimator 11, a polarizing beam splitter 22, a Wollaston prism 23, a Faraday rotator 34, and a plane mirror 15 made from optical coating. In a rectangular coordinate system, an optical axis X3 of the polarizing beam splitter is in the y-z plane, and an optical axis X4 of the Wollaston prism is parallel to the x axis. An optical axis X5 of the Wollaston prism is parallel to the y axis.

A light 300 is emitted by the single-mode single-fiber collimator 11, and radiates along the z axis. When passing through the polarizing beam splitter 22, the light is divided into two linearly polarized lights that are orthogonal: a first ordinary light 321 and a first extraordinary light 311. The lights are converged after passing through Wollaston prism 23, and pass through the Faraday rotator 34 where vibration planes are rotated by nearly 45 degrees to be a first light beam 312 and a second light beam 322. The first light beam 312 and the second light beam 322 meet at the plane mirror 15, have optical paths exchanged, and become a first reflective light 313 and a second reflective light 323, respectively. The reflective lights radiate along a negative direction of the z axis and pass through the Faraday rotator 34 for the second time. The vibration planes are again rotated by nearly 45 degrees (a total of 90 degrees) to be a third light beam 314 and a fourth light beam 324. After passing through the Wollaston prism 23, the fourth light beam 324 is divided by the polarizing beam splitter 22 to be a second ordinary light 325 and a second extraordinary light 326. The second ordinary light 325 is from the polarized light component of the fourth light beam 324 in the x-axis direction. The third light beam 314 is divided by the polarizing beam splitter 22 to be a third extraordinary light 315 and a third ordinary light 316. The third extraordinary light 315 is from the polarized light component of the third light beam 314 in the y-z plane. The third ordinary light 316 and the second extraordinary light 326 are merged to be a main light beam 399 after passing through the polarizing beam splitter 22. The third extraordinary light 315 and the second ordinary light 325 are separated from each other in a certain distance and deviate from the main light beam 399. Finally, the main light beam 399 is coupled to the single-mode single-fiber collimator 11.

The Wollaston prism 23 functions as a polarizing beam converging device made from birefringent crystal.

The Faraday rotator mirror is capable of eliminating the polarized light components along the dispersion direction of the rotation angle after 90 degrees' deviation, thus eliminating the effects of wavelength and temperature on the rotation angle and on the Faraday rotator mirror.

Example 3

Figure 12:
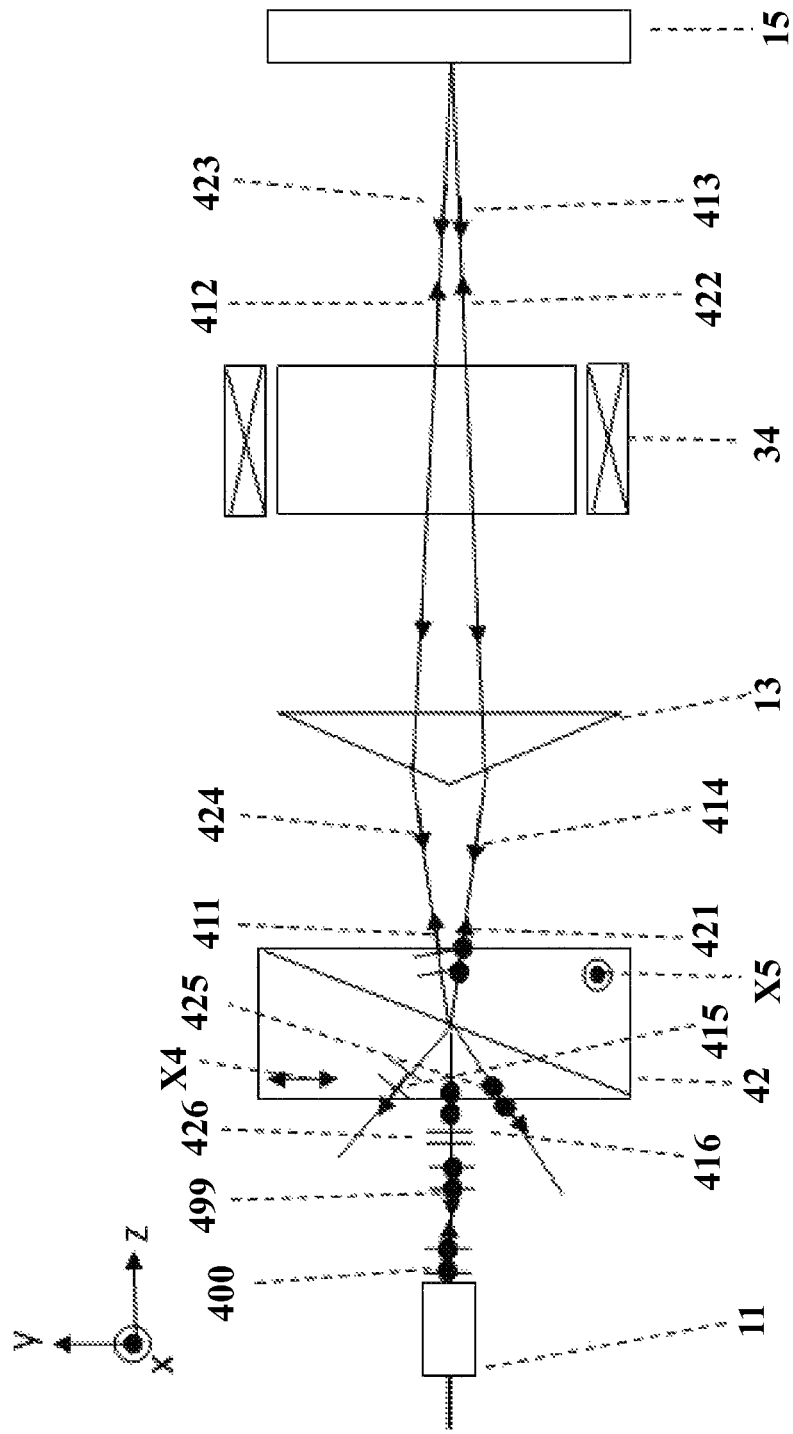
FIG. 12 is a schematic diagram of a Faraday rotator mirror and an optical path diagram in Example 3.

As shown in FIG. 12, a Faraday rotator mirror comprises a single-mode single-fiber collimator 11, a Wollaston prism 42, a Fresnel biprism 13, a Faraday rotator 34, and a plane mirror 15 made from optical coating. In a rectangular coordinate system, an optical axis X4 of the Wollaston prism is parallel to the y axis, and an optical axis X5 of the Wollaston prism is parallel to the x axis. An edge of the Fresnel biprism 13 is parallel to the x axis.

A light 400 is emitted by the single-mode single-fiber collimator 11, and radiates along the z axis. When passing through the Wollaston prism 42, the light is divided into two linearly polarized lights that are orthogonal: a first extraordinary light 411 and a first ordinary light 421. The lights are converged after passing through the Fresnel biprism 13, and pass through the Faraday rotator 34 where vibration planes are rotated by nearly 45 degrees to be a first light beam 412 and a second light beam 422. The first light beam 412 and the second light beam 422 meet at the plane mirror 15, have optical paths exchanged, and become a first reflective light 413 and a second reflective light 423, respectively. The reflective lights radiate along a negative direction of the z axis and pass through the Faraday rotator 34 and the Fresnel biprism 13 for the second time. The vibration planes are again rotated by nearly 45 degrees (a total of 90 degrees) to be a third light beam 414 and a fourth light beam 424. After entering into the Wollaston prism 42, the fourth light beam 424 is divided to be a second ordinary light 425 and a second extraordinary light 426. The second ordinary light 425 is from the polarized light component of the fourth light beam 424 in the x-axis direction. The third light beam 414 is divided to be a third extraordinary light 415 and a third ordinary light 416. The third extraordinary light 415 is from the polarized light component of the third light beam 414 in the y-z plane. The third ordinary light 416 and the second extraordinary light 426 are merged to be a main light beam 499 after passing through the Wollaston prism 42. The third extraordinary light 415 and the second ordinary light 425 are separated from each other in a certain distance and deviate from the main light beam 499. Finally, the main light beam 499 is coupled to the single-mode single-fiber collimator 11.

The Fresnel biprism 13 functions as a polarization-independent refractive beam converging device.

The Faraday rotator mirror is capable of eliminating the polarized light components along the dispersion direction of the rotation angle after 90 degrees' deviation, thus eliminating the effects of wavelength and temperature on the rotation angle and on the Faraday rotator mirror.

Example 4

Figure 13:
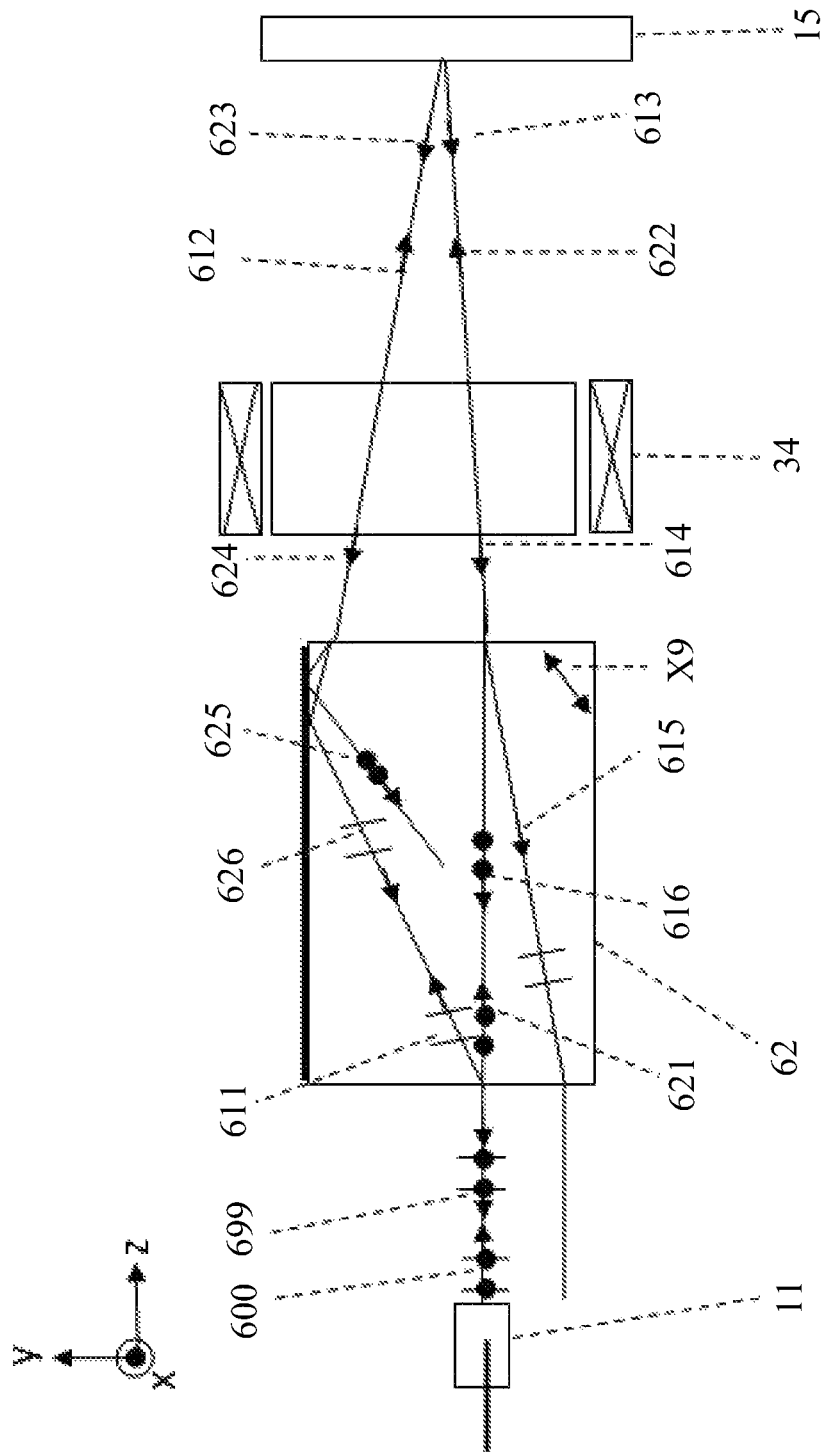
FIG. 13 is a schematic diagram of a Faraday rotator mirror and an optical path diagram in Example 4.

As shown in FIG. 13, a Faraday rotator mirror comprises a single-mode single-fiber collimator 11, a polarization beam displacer (PBD) 62 having a high-reflectivity interface on a side surface, a Faraday rotator 34, and a plane mirror 15 made from optical coating. In a rectangular coordinate system, an optical axis X9 of the polarization beam displacer is in the y-z plane.

A light 600 is emitted by the single-mode single-fiber collimator 11, and radiates along the z axis. When passing through the PBD 62, the light is divided into two linearly polarized lights that are orthogonal: a first extraordinary light 611 and a first ordinary light 621. The extraordinary light 611 is reflected by high-reflectivity interface of the PBD 62, and converges with the first ordinary light 621. The lights pass through the Faraday rotator 34 where vibration planes thereof are rotated by nearly 45 degrees to be a first light beam 612 and a second light beam 622. The first light beam 612 and the second light beam 622 meet at the plane mirror 15, have optical paths exchanged, and become a first reflective light 613 and a second reflective light 623, respectively. The reflective lights radiate along a negative direction of the z axis and pass through the Faraday rotator 34 for the second time. The vibration planes are again rotated by nearly 45 degrees (a total of 90 degrees) to be a third light beam 614 and a fourth light beam 624. After entering into the PBD 62, the fourth light beam 624 is refracted, reflected, and divided to be a second ordinary light 625 and a second extraordinary light 626. The second ordinary light 625 is from the polarized light component of the fourth light beam 624 in the y-z plane. The third light beam 614 is divided to be a third extraordinary light 615 and a third ordinary light 616. The third extraordinary light 615 is from the polarized light component of the third light beam 614 in the y-z plane. The third ordinary light 616 and the second extraordinary light 626 are merged to be a main light beam 699 after passing through the PBD 62. The third extraordinary light 615 and the second ordinary light 625 are separated from each other in a certain distance and deviate from the main light beam 699. Finally, the main light beam 699 is coupled to the single-mode single-fiber collimator 11.

The PBD 62 is a composite element of a polarizing beam splitter and a refractive beam converging device and combines the functions of the two.

The Faraday rotator mirror is capable of eliminating the polarized light components along the dispersion direction of the rotation angle after 90 degrees' deviation, thus eliminating the effects of wavelength and temperature on the rotation angle and on the Faraday rotator mirror.

Example 5

Figure 14:
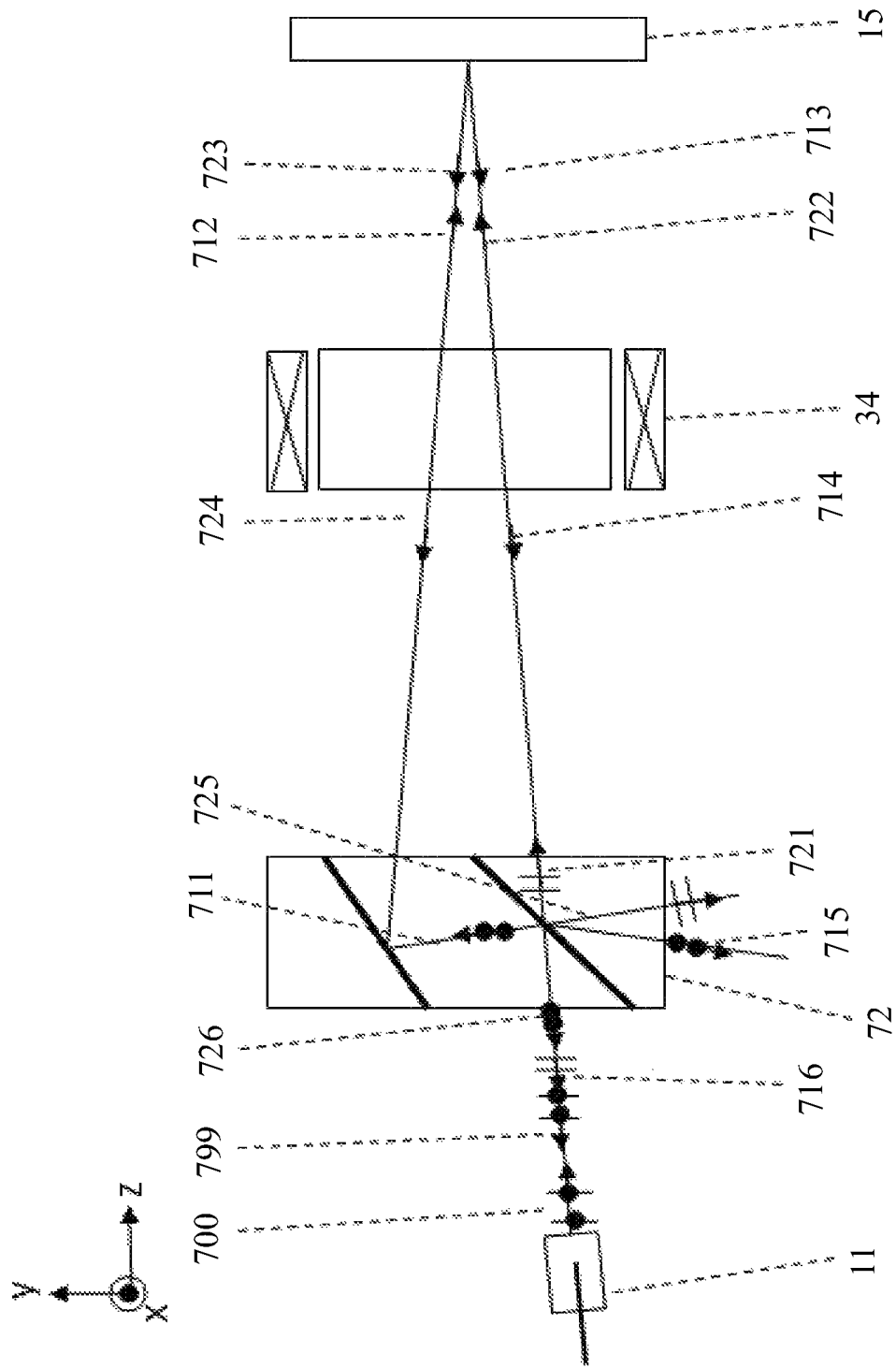
FIG. 14 is a schematic diagram of a Faraday rotator mirror and an optical path diagram in Example 5.

As shown in FIG. 14, a Faraday rotator mirror comprises a single-mode single-fiber collimator 11, a lateral displacement polarizing splitter 72, a Faraday rotator 34, and a plane mirror 15 made from optical coating.

In the following description, light s in the electric field direction of the polarized light is parallel to the x axis and light p is vertical to the x axis.

A light 700 is emitted by the single-mode single-fiber collimator 11, and radiates along the z axis. When passing through the lateral displacement polarizing splitter 72, the light is divided into two linearly polarized lights that are orthogonal: a first s light 711 and a second p light 721. The first s light 711 is reflected by a reflective interface of the Lateral Displacement Polarizing splitter 72, and converges with the second p light 721. The lights pass through the Faraday rotator 34 where vibration planes thereof are rotated by nearly 45 degrees to be a first light beam 712 and a second light beam 722. The first light beam 712 and the second light beam 722 meet at the plane mirror 15, have optical paths exchanged, and become a first reflective light 713 and a second reflective light 723, respectively. The reflective lights radiate along a negative direction of the z axis and pass through the Faraday rotator 34 for the second time. The vibration planes are again rotated by nearly 45 degrees (a total of 90 degrees) to be a third light beam 714 and a fourth light beam 724. After entering into the Lateral Displacement Polarizing splitter 72, the fourth light beam 724 is reflected and divided to be a second p light 725 and a second s light 726. The second p light 725 is from the polarized light component of the fourth light beam 724 vertical to the x axis. The third light beam 714 is divided to be a third s light 715 and a third p light 716. The third s light 715 is from the polarized light component of the third light beam 714 parallel to the x axis. The third p light 716 and the second s light 726 are merged to be a main light beam 799 after passing through the lateral displacement polarizing splitter 72. The third s light 715 and the second p light 725 are separated from each other in a certain distance and deviate from the main light beam 799. Finally, the main light beam 799 is coupled to the single-mode single-fiber collimator 11.

The lateral displacement polarizing splitter 72 is a composite element of a polarizing beam splitter and the refractive beam converging device and combines the functions of the two.

The Faraday rotator mirror is capable of eliminating the polarized light components along the dispersion direction of the rotation angle after 90 degrees' deviation, thus eliminating the effects of wavelength and temperature on the rotation angle and on the Faraday rotator mirror.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A Faraday rotator mirror, comprising: a polarizing beam splitter, a polarizing beam converging device made from birefringent crystal, a Faraday rotator, a reflecting mirror; wherein in operation, light rays from an optical coupling element pass through: the polarizing beam splitter, the polarizing beam converging device, the Faraday rotator, and the reflecting mirror, in that order, and then return back through: the Faraday rotator, the polarizing beam converging device, and the polarizing beam splitter, in that order, and are output from the optical coupling element in reverse to an original incidence path.

2. The Faraday rotator mirror of claim 1, wherein the polarizing beam converging device is a birefringent crystal element.

3. The Faraday rotator mirror of claim 2, wherein the birefringent crystal element is a Wollaston prism.

4. A Faraday rotator mirror, comprising: a composite element of a polarizing beam splitter and a polarizing beam converging device made from birefringent crystal, a Faraday rotator, a reflecting mirror; wherein in operation, light rays from an optical coupling element pass through the composite element of the polarizing beam splitter and the polarizing beam converging device, the Faraday rotator, and the reflecting mirror, in that order, and then return back through the Faraday rotator, the composite element of the polarizing beam splitter and the polarizing beam converging device, in that order, and are output from the optical coupling element in reverse to an original incidence path.

5. The Faraday rotator mirror of claim 4, wherein the composite element of the polarizing beam splitter and the polarizing beam converging device made from birefringent crystal is a Nomarski Prism.

6. A Faraday rotator mirror, comprising: a composite element of a polarizing beam splitter and a reflective beam converging device, a Faraday rotator, a reflecting mirror; wherein in operation, light rays from an optical coupling element pass through the composite element of the polarizing beam splitter and the reflective beam converging device, the Faraday rotator, and the reflecting mirror, in that order, and then return back through the Faraday rotator, the composite element of the polarizing beam splitter and the reflective beam converging device, in that order, and are output from the optical coupling element in reverse to an original incidence path.

7. The Faraday rotator mirror of claim 6, wherein the composite element of the polarizing beam splitter and the reflective beam converging device is a lateral displacement polarizing splitter or a polarization beam displacer (PBD).

8. A Faraday rotator mirror, comprising: a polarizing beam splitter, a refractive beam converging device which is polarization-independent, a Faraday rotator, a reflecting mirror; wherein in operation, light rays from an optical coupling element pass through the polarizing beam splitter, the refractive beam converging device, the Faraday rotator, and the reflecting mirror, in that order, and then return back through the Faraday rotator, the refractive beam converging device, and the polarizing beam splitter, in that order, and are output from the optical coupling element in reverse to an original incidence path.

9. The Faraday rotator mirror of claim 8, wherein the refractive beam converging device is a Fresnel biprism.

10. A Faraday rotator mirror, comprising: a polarizing beam splitter, a Faraday rotator, a refractive beam converging device which is polarization-independent, a reflecting mirror; wherein in operation, light rays from an optical coupling element pass through the polarizing beam splitter, the Faraday rotator, the refractive beam converging device, and the reflecting mirror, in that order, and then return back through the refractive beam converging device, the Faraday rotator, and the polarizing beam splitter, in that order, and are output from the optical coupling element in reverse to an original incidence path.

11. The Faraday rotator mirror of claim 10, wherein the refractive beam converging device is a Fresnel biprism.

* * * * *